United States Patent [19]
Corelli et al.

[11] 3,767,246
[45] Oct. 23, 1973

[54] SANITARY DISPOSAL APPARATUS

[76] Inventors: Robert Corelli; Olga V. Corelli, both of 35 W. 74th St., New York, N.Y. 10023

[22] Filed: Aug. 31, 1972

[21] Appl. No.: 285,419

[52] U.S. Cl. ............................. 294/19 R, 294/1 R
[51] Int. Cl. ............................................. A47f 13/06
[58] Field of Search .................. 294/1 R, 19 R, 29, 294/31.2, 55; 15/104.8, 257.1, 257.4; 119/1 R; 206/47 R, 47 B; 229/1.5 H, 22; 248/95, 94, 99

[56] References Cited
UNITED STATES PATENTS

| | | | |
|---|---|---|---|
| 3,281,178 | 10/1966 | Fisher | 294/1 R |
| 3,052,214 | 9/1962 | Johnson | 294/1 R |
| 614,858 | 11/1898 | Grove | 15/257.4 |
| 1,262,294 | 4/1918 | Wright | 15/257.4 |
| 2,100,888 | 11/1937 | Vine | 229/22 X |

Primary Examiner—Evon C. Blunk
Assistant Examiner—Johnny D. Cherry
Attorney—Allison C. Collard

[57] ABSTRACT

A sanitary dog litter disposal apparatus comprising an elongated handle, a wire frame disposed on the end of the handle, and a disposable container inserted in the frame at the end of the handle. The container is positioned under the hind quarters of an animal by means of the handle, and the container is sealed, removed from the frame and discarded in a suitable collection container to dispose of the dog litter.

5 Claims, 6 Drawing Figures

PATENTED OCT 23 1973 3,767,246
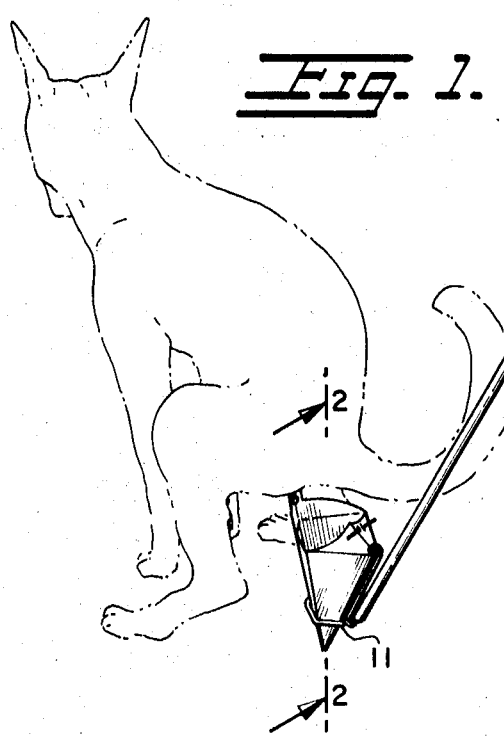
Fig. 1.
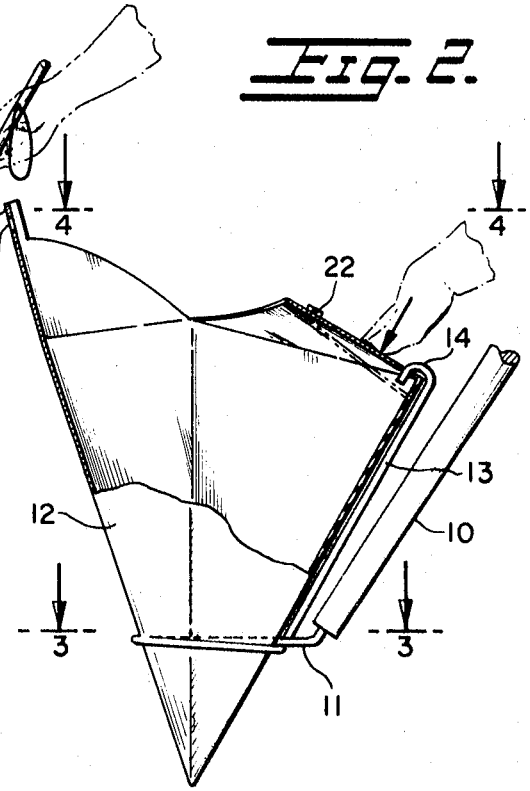
Fig. 2.
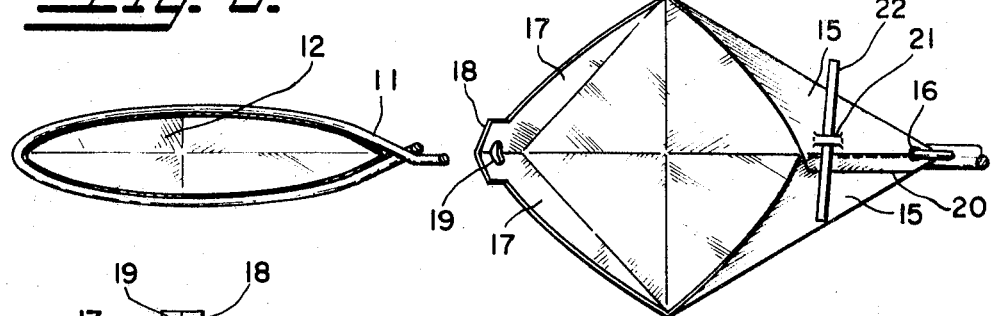
Fig. 3.
Fig. 4.
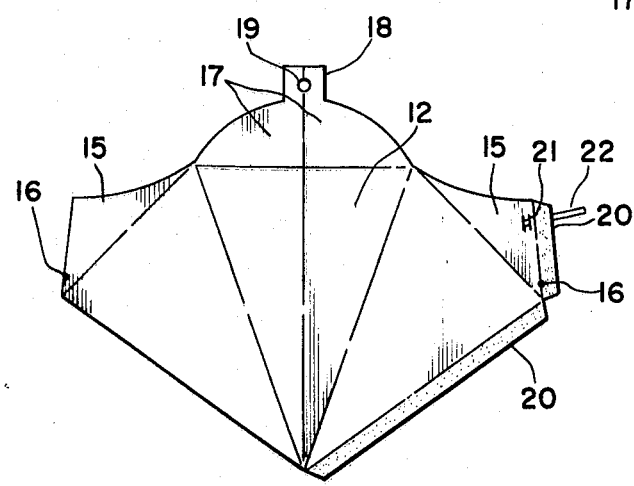
Fig. 5.
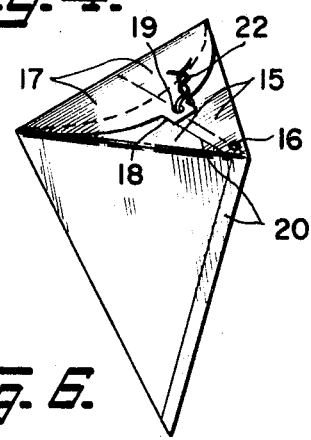
Fig. 6.

SANITARY DISPOSAL APPARATUS

The present invention relates to sanitary devices, and in particular to a portable sanitary apparatus for disposing of dog litter.

In recent years, much emphasis has been placed on improving the environment of large urban areas. In many cities, an expanding dog population has created environmental health problems which have led government officials to place strict controls on dog owners and urge that owners clean up after their animals.

Accordingly, the present invention provides a sanitary dog litter disposal apparatus which enables a dog owner to dispose of dog litter in a clean and efficient manner. The apparatus comprises a handle and a wire support frame securely affixed to one end of the handle. A disposable container, comprising a planar sheet of material folded into a cup is disposed on the wire frame for receiving the dog litter. To dispose of the dog litter, a flap provided on the container is folded over the top thereof, and the cup is lifted from the wire frame and disposed in a suitable collection container.

It is, therefore, an object of the present invention to provide an apparatus for disposing of dog litter which is sanitary, simple in design, easy to manufacture, and efficient in its operation.

Other objects and features of the present invention will become apparent from the following detailed description taken in connection with the accompanying drawings which disclose one of the embodiments of the invention. It is to be understood, however, that the drawings are designed for the purposes of illustration only, and are not intended as a definition of the limits and scope of the invention.

In the drawings, wherein similar reference numerals denote similar elements throughout the several views:

FIG. 1 is a perspective view of a dog litter disposal apparatus constructed in accordance with the present invention, shown during use;

FIG. 2 is a partial, cross-sectional side view of the container of the apparatus of the present invention, taken along section 2—2 of FIG. 1;

FIG. 3 is a cross-sectional top view of the container, taken along section 3—3 of FIG. 2;

FIG. 4 is a top view of the container of the apparatus looking in the direction of arrows 4—4 of FIG. 2;

FIG. 5 is a planar view of the container of the apparatus, shown in its unfolded form; and FIG. 6 is a perspective view of the container in its assembled form, with the flap thereof secured closed over the opening of the container, for disposal of the dog litter.

Referring to the drawings, the dog litter disposal apparatus of the present invention comprises an elongated stick handle 10 having a wire frame 11 disposed on one end thereof. The wire frame is secured in a suitable aperture provided in the handle, and is disposed horizontally with respect to the ground when the stick is held in the illustrated position. The frame is bent so as to form an oval-shaped receptacle frame for container 12. The frame includes an upwardly extending portion 13 having a hook 14 formed on the end thereof for disposal over the edge of container 12 and securing the container in the oval-shaped horizontal portion of the frame. The hook limits the vertical movement of the container and prevents it from accidentally dislodging itself from frame 11.

The container comprises a planar sheet of paper scored in a plurality of predetermined places and folded so as to form a container having a diamond shape. The container has foldable, closable flaps at the top end thereof adjacent the opening for sealing the container prior to disposal. The container includes two integrally formed foldable upper flaps 15 having apertures 16 which receive hook 14 to secure the container in the horizontal portion of the frame. Flaps 17 are foldable over the opening of the container formed by the planar sheet of material. Flaps 17 include a tab 18 at their end. The tab has a hole 19 for receiving a tie cord or twistable ribbon 22, inserted through riser 21 formed in the top of the container adjacent to flap 20.

In operation, the container is formed by folding the planar sheet of paper, shown in FIG. 5, along the score points to form the diamond-shaped receptacle illustrated. Pressure sensitive adhesive material is disposed on flaps 20 to secure the container together. The container is disposed in frame 11, as shown, and then positioned under the hind quarters of the animal. Flaps 17 are then folded over the opening of the container, so that ribbon or cord 22 can be inserted through hole 19 in tab 18, and twisted closed. The container is then lifted from the frame and disposed in any suitable manner. It should be noted that when the container is initially folded it has a diamond shape, and that after flaps 17 are secured over the opening thereof, it has a triangular shape. The initial shape provides a wider opening for the container while the triangular shape provides greater strength and rigidity for disposal.

Any suitable construction materials may be used, such as wood for the handle, wire for the frame and ribbon 22, and paper for the container. Any other suitable conventional materials may, however, be used, as would be clear to persons skilled in the art.

While only a single embodiment of the present invention may be shown and described, it will be obvious to those persons of ordinary skill in the art that many changes and modifications may be made thereunto without departing from the spirit and scope of the invention.

What is claimed is:

1. A sanitary disposal apparatus for animal litter comprising:
   an elongated handle;
   a wire frame, disposed on one end of said handle, said wire frame including a single length of rigid wire having an oval shape, and an additional portion extending upwardly substantially parallel to said handle and including a downwardly disposed hook;
   a disposable container detachably secured in said wire frame and engaging the downwardly disposed hook to secure said container to handle and including at least one foldable closure flap, for receiving the dog litter.

2. The apparatus as recited in claim 1, wherein said container comprises a planar sheet of material scored along a plurality of points thereon so as to be foldable to form said container having an opening at one end thereof, said flap closure being foldable over said opening for sealing said container.

3. The apparatus as recited in claim 2, wherein said container includes at least one aperture disposed in the top surface thereof for receiving said hook formed on said frame, thereby detachably securing said container in said frame on said handle.

4. The apparatus as recited in claim 3, further comprising fastening means, disposed on said container, for securing said closure flap over said opening of said container.

5. The apparatus as recited in claim 4, wherein said fastening means comprises a tab secured on said closure flap and having an opening, and cord means secured to said container for connection through the opening of said tab for closing said flap.

* * * * *